US009830667B2

(12) United States Patent
Schroeder et al.

(10) Patent No.: US 9,830,667 B2
(45) Date of Patent: Nov. 28, 2017

(54) COMPUTERIZED INVOICE RECORD AND RECEIPT RECORD MATCHING WITH AUTOMATIC DISCREPANCY RESOLUTION

(71) Applicant: ORACLE INTERNATIONAL CORPORATION, Redwood Shores, CA (US)

(72) Inventors: Jurgen Schroeder, Plymouth, MN (US); Gerald J. Hanson, Apple Valley, MN (US); Dmitriy Uchenik, Burnsville, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/955,171

(22) Filed: Dec. 1, 2015

(65) Prior Publication Data
US 2017/0154384 A1 Jun. 1, 2017

(51) Int. Cl.
*G06Q 40/00* (2012.01)
*G06Q 50/18* (2012.01)
(Continued)

(52) U.S. Cl.
CPC .............. *G06Q 40/12* (2013.12); *G06F 19/00* (2013.01); *G06Q 20/00* (2013.01); *G06Q 20/10* (2013.01);
(Continued)

(58) Field of Classification Search
CPC ........ G06Q 20/14; G06Q 20/00; G06Q 20/10; G06Q 40/00; G06Q 30/00; G06Q 10/00;
(Continued)

(56) References Cited

U.S. PATENT DOCUMENTS 5,189,608 A * 2/1993 Lyons .................. G06F 17/246
705/30
7,130,822 B1 * 10/2006 Their ................. G06Q 30/0202
705/1.1
(Continued)

FOREIGN PATENT DOCUMENTS

EP          1364328 A2    11/2003

OTHER PUBLICATIONS

Omega, Invoice Verification, pp. 1-7; downloaded Jul. 23, 2015 from: http://www.omega.no/support/userguide-cost/ug-invoiceverification.
(Continued)

*Primary Examiner* — Olusegun Goyea
(74) *Attorney, Agent, or Firm* — Cooper Legal Group, LLC

(57) ABSTRACT

Systems, methods, and other embodiments associated with invoice record and receipt record matching with automatic discrepancy resolution are described. In one embodiment, a method includes matching an invoice record to a receipt record and determining any remaining quantity discrepancy amount or cost discrepancy amount between the matched invoice record and receipt record. At least one tolerance window is identified, from a set of tolerance windows, into which the quantity discrepancy amount and the cost discrepancy amount fall. At least one resolution action, of a set of resolution actions, is identified which is mapped to the at least one identified tolerance window. A computing system is automatically triggered to perform the at least one identified resolution action to resolve the quantity discrepancy amount and the cost discrepancy amount.

20 Claims, 7 Drawing Sheets

(51) Int. Cl.
*G06Q 30/02* (2012.01)
*G06Q 30/00* (2012.01)
*G06Q 30/06* (2012.01)
*G06Q 20/14* (2012.01)
*G06F 19/00* (2011.01)
*G06Q 20/00* (2012.01)
*G06Q 20/10* (2012.01)

(52) U.S. Cl.
CPC ............. *G06Q 20/14* (2013.01); *G06Q 30/00* (2013.01); *G06Q 30/02* (2013.01); *G06Q 30/06* (2013.01); *G06Q 50/182* (2013.01)

(58) Field of Classification Search
CPC ........ G06Q 30/06; G06Q 30/02; G06Q 10/08; G06Q 40/12; G06F 19/00
USPC ............ 705/40, 39, 7.11, 5, 7.12, 22, 30, 28
See application file for complete search history.

(56) References Cited

U.S. PATENT DOCUMENTS

| | | | |
|---|---|---|---|
| 7,437,327 B2 | 10/2008 | Lam et al. | |
| 7,539,634 B2* | 5/2009 | Goodbody | G06Q 10/087 705/28 |
| 8,112,355 B1* | 2/2012 | Lam | G06Q 20/10 705/1.1 |
| 8,285,573 B1* | 10/2012 | Ballaro | G06Q 10/087 705/22 |
| 8,326,754 B2* | 12/2012 | Bandych | G06Q 20/10 705/30 |
| 8,694,429 B1* | 4/2014 | Ballaro | G06Q 30/0601 705/40 |
| 2002/0026416 A1* | 2/2002 | Provinse | G06Q 10/02 705/39 |
| 2002/0107794 A1* | 8/2002 | Furphy | G06Q 10/0875 705/40 |
| 2002/0198830 A1 | 12/2002 | Randell et al. | |
| 2003/0120563 A1* | 6/2003 | Meyer | G06Q 10/087 705/28 |
| 2003/0220858 A1* | 11/2003 | Lam | G06Q 30/04 705/35 |
| 2004/0059597 A1* | 3/2004 | Tkaczyk | G06F 19/322 705/2 |
| 2005/0177470 A1* | 8/2005 | Tandon | G06Q 20/10 705/30 |
| 2005/0177507 A1* | 8/2005 | Bandych | G06Q 20/102 705/40 |
| 2009/0164347 A1* | 6/2009 | Sison | G06Q 40/12 705/30 |
| 2013/0054421 A1* | 2/2013 | Bandych | G06Q 20/102 705/26.81 |
| 2013/0304639 A1 | 11/2013 | Acsay et al. | |
| 2014/0032427 A1 | 1/2014 | Gannon | |
| 2015/0142646 A1* | 5/2015 | Timm | G06Q 20/14 705/40 |
| 2015/0242966 A1* | 8/2015 | Marlowe | G06Q 10/087 705/34 |
| 2016/0300277 A1* | 10/2016 | Marlowe | G06Q 10/087 |
| 2017/0103455 A1* | 4/2017 | Schroeder | G06Q 40/02 |

OTHER PUBLICATIONS

Dynamic Business Solutions, Resolve Invoice Matching Discrepancies, pp. 1-2; downloaded Jul. 23, 2015 from: http://dynamicbusinesssolutions.ru/axinfowk.en/html/82852252-b348-436b-92fb-f26f3982337c.htm.

* cited by examiner

COMPUTERIZED INVOICE RECORD AND RECEIPT RECORD MATCHING WITH AUTOMATIC DISCREPANCY RESOLUTION

BACKGROUND

Businesses commonly verify receipt of goods from a supplier prior to paying the supplier's invoice for the goods. This verification process typically involves matching an invoice to one or more receipt records that show that the goods were received by the business. Modern businesses have computerized invoice matching systems that match invoice records to receipt records and automatically approve an invoice for payment when a matching receipt is found.

Sometimes, when an invoice is matched to a receipt, a discrepancy still exists between the two. The discrepancy may be with respect to cost and/or quantity of an item. In current systems, the only option for a system to automatically manage cases where a discrepancy exists is to pay the invoice amount, regardless of whether the invoice amount exceeds the expected amount or is less than the expected amount, and post the difference to a specified general ledger account. Any other treatment desired by the business requires a user to intervene to attempt to resolve the discrepancy. This comes at the expense of the user's time and could lead to mistakes or delays that could further cost the business.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
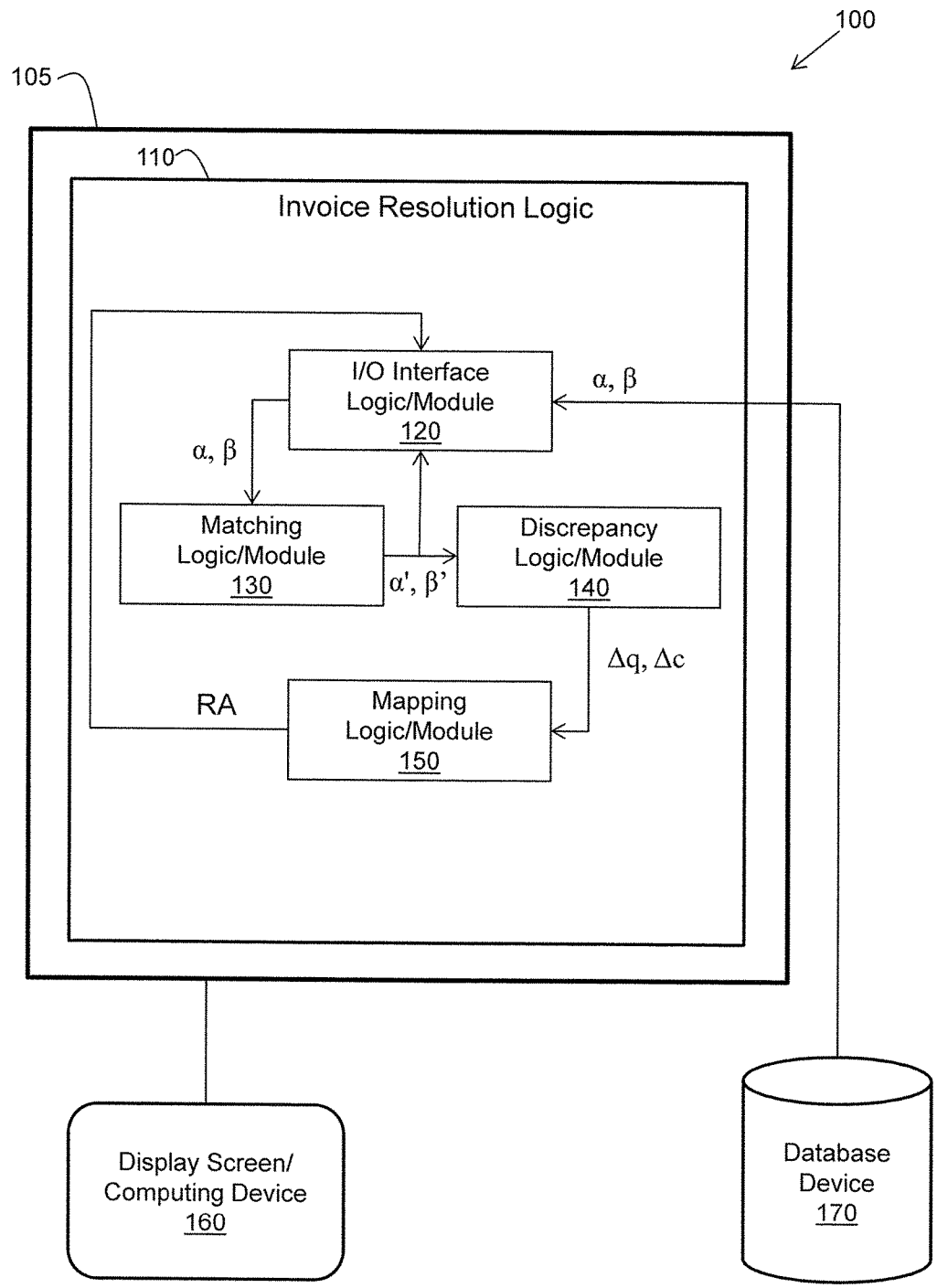
FIG. 1 illustrates one example embodiment of a system associated with invoice record and receipt record matching with automatic discrepancy resolution.

Systems, methods, and other embodiments are disclosed that match receipt records to invoice records and resolve discrepancies between a matched pair of receipt and invoice records. A configurable and automated resolution discrepancy capability is provided. A user can configure specific resolution actions to be automatically taken by a computerized system when specific discrepancy conditions exist. During an invoice matching business process, when invoices do not match to purchase order receipts exactly (e.g., match within a pre-defined tolerance window), a pre-defined resolution action is identified and initiated to resolve specific types of discrepancies.

In accordance with one embodiment, configurable options are provided for automatically taking specific actions for very specific scenarios of under-billing or over-billing, by cost or quantity, with variable levels of discrepancy and with configurability at multiple levels. Resolution actions are based on the nature of the discrepancy (e.g., cost or quantity, in favor of business or vendor, magnitude of discrepancy). Tolerances can be established at a variety of levels to allow small differences between costs and quantities to be taken into consideration and to allow records to match with small differences being written off to specified accounts.

Resolution actions are established to take a specific response to resolve a discrepancy. For example, one resolution action may create a debit memo (chargeback) to reduce the payment to the vendor when the invoice exceeds the expected amount. Another resolution action may allow an inventory value to be adjusted to match an amount invoiced by the vendor, whether the invoiced inventory value is greater than or less than an expected inventory value. Other resolution actions are possible as well and depend on the nature of the discrepancy (e.g., cost or quantity) and whether the discrepancy is in favor of the business or the vendor.

In one embodiment, tolerances are established at multiple levels (multiple tolerance windows or data ranges) with the ability to treat the different levels in different manners. Each level of the tolerances is able to have a resolution action associated with it. The association determines the specific action that is taken when the conditions for that tolerance level (tolerance window) exist. Tolerance levels can be configured for small and large differences between invoice record values and receipt record values.

The following terms are used herein with respect to various embodiments.

The term "item" or "retail item", as used herein, refers to merchandise sold, purchased, and/or returned in a business environment and associated with quantity amounts and cost amounts on invoice records and receipt records.

The term "invoice record" or "invoice", as used herein, refers to an itemized electronic bill for goods sold or services provided, which may contain data associated with individual costs and quantities, a total cost and a total quantity, and terms.

The term "receipt record" or "receipt", as used herein, refers to an electronic acknowledgment having data associated with having received, or taken into one's possession, a specified quantity of items at a specified cost.

The term "discrepancy", as used herein, refers to a difference in item quantity or item price reflected in an invoice record and a matched receipt record.

The terms "tolerance window, "tolerance data range", and "range bin" are used interchangeably herein.

FIG. 1 illustrates one embodiment of a computer system 100, having a computing device 105 configured with an invoice resolution logic 110. For example, in one embodiment, the invoice resolution logic 110 may be part of a larger computer application (e.g., a computerized accounting system, a computerized billing system, or a computerized invoice management system), configured to handle various financial aspects of a business. The invoice resolution logic 110 is configured to computerize the process of matching invoice records to receipt records and automatically resolving discrepancies. The embodiments described herein take into consideration the type and magnitude of the discrepancy when identifying a resolution.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

In one embodiment, algorithms are disclosed that implement an analytical approach for matching invoices to receipts and automatically resolve discrepancies. It is assumed herein that both invoice records and receipt records, having both item quantity data and item cost data, are available for use and that embodiments provide a configurable approach to resolving different discrepancy scenarios. It is also assumed herein that discrepancy resolution proceeds on pairs of invoice and receipt records that are considered to be matched. The ability to configure a system to automatically handle multiple discrepancy scenarios can greatly contribute to resolving discrepancies between invoices and receipts in a manner that minimizes lost time and costs to a business.

With reference to FIG. 1, in one embodiment, the invoice resolution logic 110 is implemented on the computing device 105 and includes logics or modules for implementing various functional aspects of the invoice resolution logic 110. In one embodiment, the invoice resolution logic 110 includes input/output interface logic/module 120, matching logic/module 130, discrepancy logic/module 140, and mapping logic/module 150.

Other embodiments may provide different logics or combinations of logics that provide the same or similar functionality as the invoice resolution logic 110 of FIG. 1. In one embodiment, the invoice resolution logic 110 is an executable application including algorithms and/or program modules configured to perform the functions of the logics. The application is stored in a non-transitory computer storage medium. That is, in one embodiment, the logics of the invoice resolution logic 110 are implemented as modules of instructions stored on a computer-readable medium.

The computer system 100 also includes a display screen 160 operably connected to the computing device 105. In accordance with one embodiment, the display screen 160 is implemented to display views of and facilitate user interaction with a graphical user interface (GUI) generated by input/output interface logic 120 (where input/output logic 120 includes a visual user interface logic) for viewing and updating information associated with resolving discrepancies between matched invoice records and receipt records. The graphical user interface may be associated with an invoice resolution application and input/output interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 160 may represent multiple computing devices/terminals that allow users to access and receive services from invoice resolution logic 110 via networked computer communications.

In one embodiment, the computer system 100 further includes at least one database device 170 operably connected to the computing device 105 and/or a network interface to access the database device 170 via a network connection. For example, in one embodiment, the database device 170 is operably connected to input/output interface logic 120. In accordance with one embodiment, the database device 170 is configured to store and manage data structures associated with invoice resolution logic 110 in a database system (e.g., a computerized inventory management and demand forecasting application). The data structures may include, for example, invoice records and receipt records associated with a business.

Referring back to the logics of invoice resolution logic 110 of FIG. 1, in one embodiment, input/output interface logic 120 is a visual user interface logic configured to generate a graphical user interface (GUI) to facilitate user interaction with invoice resolution logic 110. For example, input/output interface logic 120 includes program code that generates and causes the graphical user interface to be displayed based on an implemented graphical design of the interface. In response to user actions and selections via the GUI, associated aspects of resolving discrepancies between matched invoices and records may be manipulated. For example, the graphical user interface may facilitate user configuration of a set of tolerance windows (tolerance data ranges) in a tolerance data structure, a set of resolution actions in a resolution data structure, and mapping the set of resolution actions to the set of tolerance windows via a mapping data structure by the user. Tolerance windows, resolution actions, and mapping are discussed in detail later herein.

In one embodiment, input/output interface logic 120 is configured to facilitate receiving inputs and reading data in response to user actions. For example, input/output interface logic 120 may facilitate the inputting and reading of multiple invoice records $\alpha$ and multiple receipt records $\beta$. Each invoice record includes data describing an invoice quantity of items and an invoice cost. Each receipt record includes data describing a receipt quantity of items and a receipt cost. The invoice records and the receipt records may reside in data structures (e.g., within database device 170) associated with (and accessible by) an invoice resolution application (e.g., invoice resolution logic 110) via the graphical user interface. The records may be read into data structures in a memory associated with input/output interface logic 120, for example.

Furthermore, input/output interface logic 120 is configured to facilitate the outputting and/or displaying of data, via the graphical user interface, on the display screen 160. In one embodiment, mapping logic 150 is configured to operably interact with input/output interface logic 120 to facilitate outputting of resolution action (RA) data of an output data structure. Furthermore, in one embodiment, matching logic 130 is configured to operably interact with input/output interface logic 120 to receive the multiple invoice records $\alpha$ along with the multiple receipt records $\beta$. Also, in one embodiment, matching logic 130 is configured to operably interact with input/output logic 120 to output an invoice record $\alpha'$, of the multiple invoice records $\alpha$, and a receipt record $\beta'$, of the multiple receipt records $\beta$, that have been matched to each other.

Referring again to FIG. 1, in one embodiment, matching logic 130 is configured to match an invoice record $\alpha'$, of the multiple invoice records $\alpha$, to a receipt record $\beta'$, of the multiple receipt records β. Matching logic 130 considers all of the multiple receipt records β and finds that receipt record β' that best matches the invoice record α'. Details of one embodiment of matching an invoice record to a receipt record are discussed herein with respect to FIG. 6.

Even though an invoice record is matched to a receipt record, discrepancies may still exist between the two records. In one embodiment, discrepancy logic 140 is configured to determine any quantity discrepancy amount Δq and any cost discrepancy amount Δc between the matched invoice record α' and receipt record β', as matched by matching logic 130. The quantity discrepancy amount may be expressed as a number of items or a percentage value, for example. The cost discrepancy amount may be expressed as a monetary amount or a percentage value, for example.

The quantity discrepancy amount may be in favor of the retailer (business) or the vendor (supplier), or may be zero (i.e., no quantity discrepancy). Similarly, the cost discrepancy amount may be in favor of the retailer (business) or the vendor (supplier), or may be zero (i.e., no cost discrepancy). In one embodiment, when in favor of the retailer, a discrepancy amount may be expressed as a positive value, for example. When in favor of the vendor, a discrepancy amount may be expressed as a negative value, for example.

In one embodiment, mapping logic 150 is configured to receive the quantity discrepancy amount Δq and the cost discrepancy amount Δc from discrepancy logic 140. Mapping logic 150 is further configured to identify at least one tolerance window, from a set of tolerance windows, into which the quantity discrepancy amount and the cost discrepancy amount fall. Mapping logic 150 is also configured to access a mapping data structure that stores a mapping of tolerance windows to resolution actions. In one embodiment, the mapping data structure is accessed by addressing the mapping data structure with the identified tolerance window(s) to obtain at least one corresponding resolution action as an output. That is, mapping logic 150 is configured to identify at least one resolution action RA, of a set of resolution actions, mapped to the identified tolerance window(s). Possible resolution actions that a discrepancy pair (Δq, Δc) may map to include, for example, creating a debit memo (chargeback) to reduce the payment to the vendor when the invoice exceeds the expected amount, or adjusting an inventory value to match an amount invoiced by the vendor, whether the invoiced inventory value is greater than or less than an expected inventory value.

In one embodiment, input/output logic 120 is configured to receive an identified resolution action(s) RA from mapping logic 150. Input/output logic 120 is further configured to generate an electronic message that identifies the resolution action(s). Input/output logic 120 is also configured to transmit the electronic message (e.g., via network communications) to a remote computing system to cause the remote computing system to perform the resolution action(s) to resolve the quantity discrepancy amount Δq and the cost discrepancy amount Δc.

The computing system may be, for example, a financial computing system. In accordance with one embodiment, invoice resolution logic 110 is part of the financial computing system. In accordance with another embodiment, the financial computing system is separate and external to invoice resolution logic 110 (e.g., computing system 105 may communicate with an external and remote financial computing system over a computerized network).

In this manner, invoice resolution logic 110 is capable of matching an invoice record to a receipt record, determine any discrepancies between the matched invoice record and receipt record, and identify an appropriate resolution action to be taken to resolve any discrepancies. The matching and resolution functions of invoice resolution logic 110 may be performed automatically, without any user intervention. Furthermore, an electronic message that is generated and transmitted to a computer system causes the computer system to resolve any discrepancies in an automatic manner (i.e., without user intervention).

Figure 2:
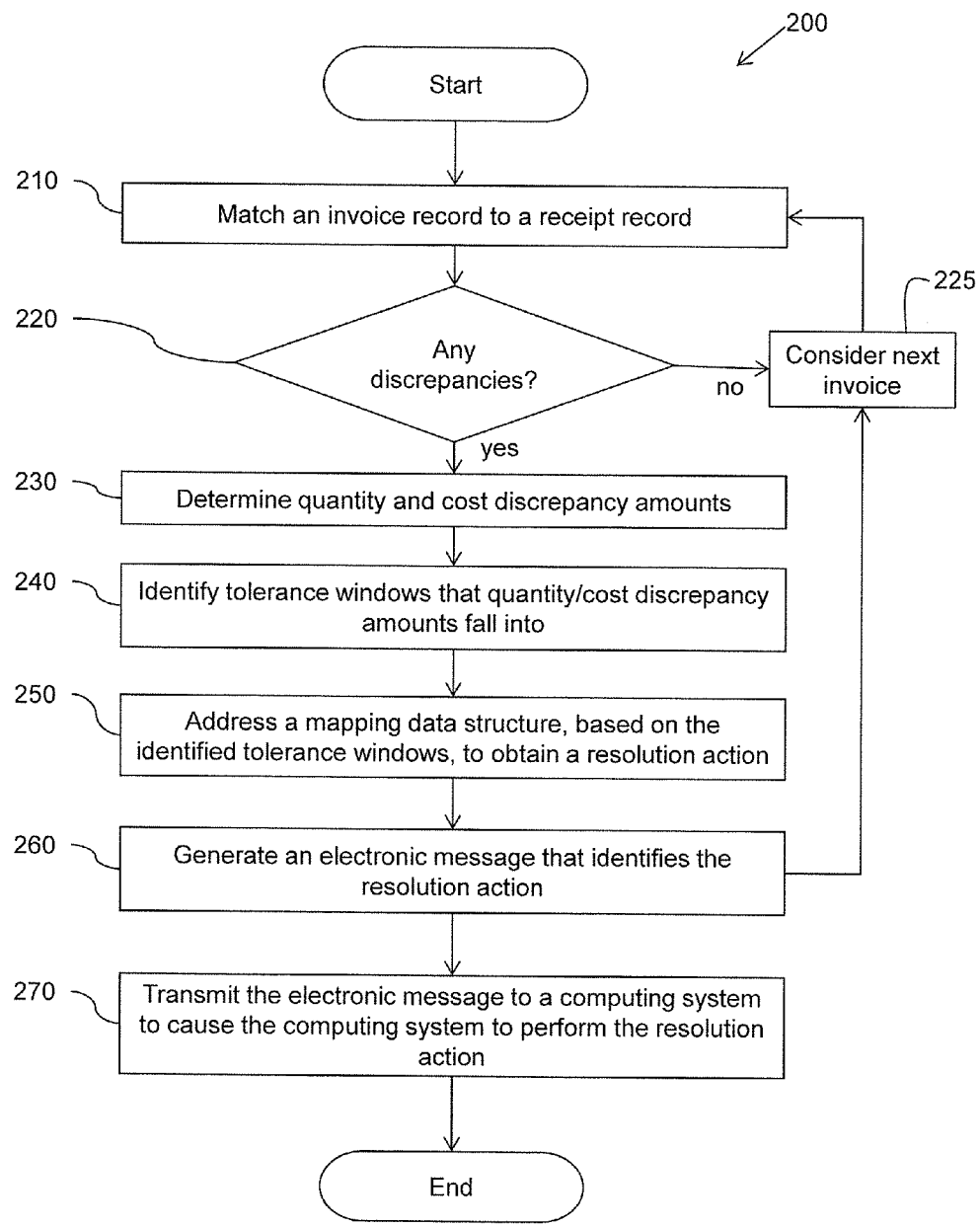
FIG. 2 illustrates one embodiment of a method of automatically resolving discrepancies between matched invoice and receipt records as performable by the system of FIG. 1.

FIG. 2 illustrates one embodiment of a computer-implemented method, which can be performed by invoice resolution logic 110 of FIG. 1, for automatically resolving discrepancies between matched invoice and receipt records. Method 200 describes operations of invoice resolution logic 110 and is implemented to be performed by invoice resolution logic 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that invoice records and receipt records are available in electronic form for processing by invoice resolution logic 110, and that an invoice record should be able to be matched (e.g., in a "best match" sense) to a receipt record. Invoice records and receipt records may be stored in one or more database devices (e.g., database device 170) that are accessible by invoice resolution logic 110. In accordance with one embodiment, invoice resolution logic 110 is configured to read invoice records and receipt records as data structures in the database device 170 (e.g., retrieve invoice records and receipt records from the database device 170).

Receipt records may include both quantity data and cost data associated with items purchased and received by a retailer from a supplier. Invoice records may include both quantity data and cost data associated with items sold to a retailer by a supplier. It is assumed that an invoice record sent from a supplier to a retailer (e.g. for billing purposes) should be associated with a receipt record of the retailer which indicates the quantity and cost of the items that were received at the retailer. However, even when an invoice record matches to a receipt record, discrepancies in the corresponding item quantities and costs sometimes exist.

Such discrepancies can be of different levels or magnitudes across various matched pairs of invoice records and receipt records. Furthermore, various combinations of quantity discrepancies and cost discrepancies can exist across various matched pairs of invoice records and receipt records. In accordance with one embodiment, method 200 accounts for the different levels, magnitudes, and combinations of discrepancies that can occur and can provide a different resolution action for different scenarios.

Upon initiating method 200, at block 210, an invoice record is matched to a receipt record. The invoice record stores data (e.g., in a first memory) describing an invoice quantity of items and an invoice cost. The receipt record stores data (e.g., in a second memory) describing a receipt quantity of items and a receipt cost. In one embodiment, the matching process of block 210 is performed by matching logic 130 of invoice resolution logic 110 of FIG. 1. Matching the invoice record to the receipt record may include performing at least one computerized comparison operation. The computerized comparison operation(s) is performed between the invoice records and receipt records to find a receipt record that matches an invoice record based on at least one set of matching criteria. Details of one embodiment of matching an invoice record to a receipt record are discussed herein with respect to FIG. 6.

At block 220, if the invoice record and the receipt record match exactly (i.e., no discrepancies exist), then method 200 proceeds to block 225 where a next invoice record to be matched is considered. Method 200 then proceeds back to block 210 to perform the matching. However, at block 220, if the invoice record and the receipt record do not match exactly (at least one discrepancy exists), then method 200 proceeds to block 230.

At block 230, a quantity discrepancy amount $\Delta q$ and a cost discrepancy amount $\Delta c$ are determined, where the discrepancy amounts are between the matched invoice and receipt records. The quantity discrepancy amount $\Delta q$ may be zero, or may be some non-zero amount that favors either the retailer or the vendor. Similarly, the cost discrepancy amount $\Delta c$ may be zero, or may be some non-zero amount that favors either the retailer or the vendor. However, at block 230, at least one of the quantity discrepancy amount $\Delta q$ or the cost discrepancy amount $\Delta c$ is non-zero. The discrepancy amounts form a discrepancy pair ($\Delta q$, $\Delta c$). In one embodiment, the discrepancy determinations of blocks 220 and 230 are performed by discrepancy logic 140 of invoice resolution logic 110 of FIG. 1.

At block 240, at least one tolerance data range is identified, from a set of tolerance data ranges stored in a first data structure (e.g., a tolerance data structure), in which the quantity discrepancy amount $\Delta q$ and the cost discrepancy amount $\Delta c$ are included. At block 250, a second data structure (e.g., a mapping data structure) is accessed that stores a mapping of tolerance data ranges to resolution actions. In one embodiment, the accessing includes addressing the second data structure with the tolerance data range(s) to obtain at least one corresponding resolution action.

Figure 3:
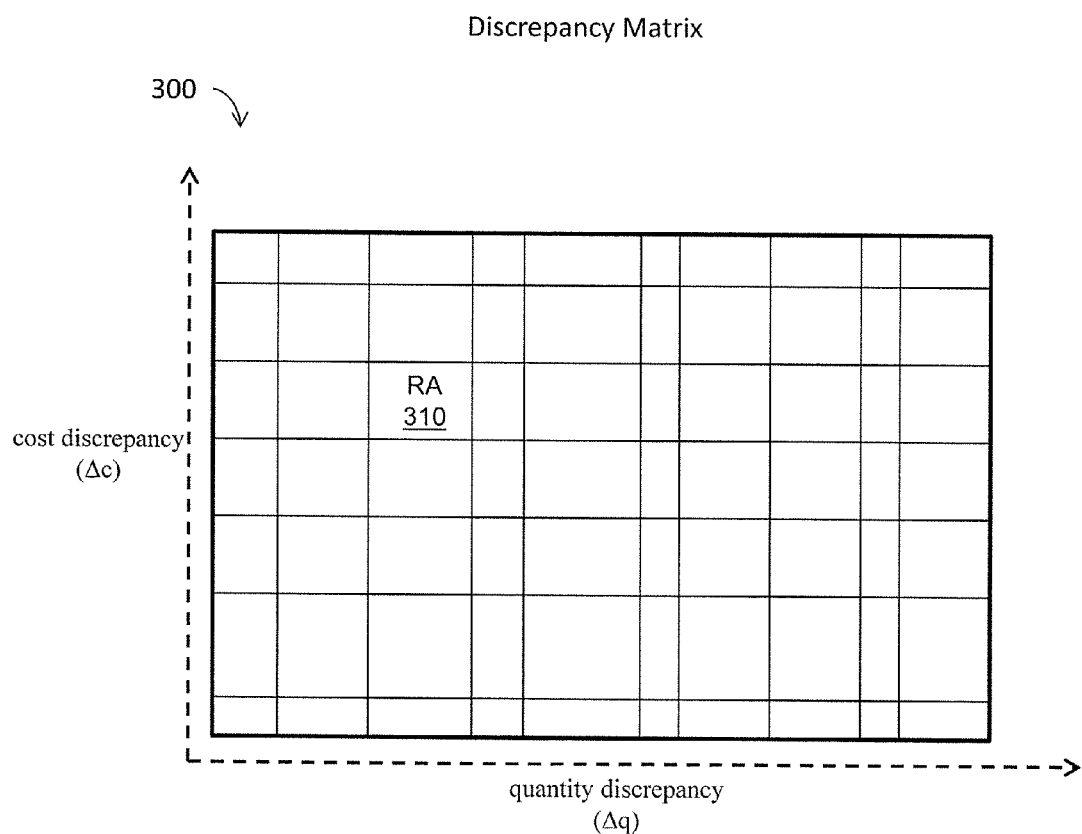
FIG. 3 illustrates a graphical representation of one embodiment of a data structure that maps tolerance windows, covering ranges of cost discrepancies and quantity discrepancies, to resolution actions.

For example, FIG. 3 illustrates a graphical representation of one embodiment of a discrepancy matrix 300 (a mapping data structure) that maps tolerance data ranges, covering ranges of cost discrepancies and quantity discrepancies, to resolution actions RA. For example, the discrepancy pair ($\Delta q$, $\Delta c$) determined at block 230 may fall into tolerance data range (window) 310 in FIG. 3. Tolerance data range 310 maps to the resolution action RA shown in FIG. 3. Different tolerance windows can have different sizes. That is, different tolerance windows can correspond to different spans or ranges of $\Delta q$ and $\Delta c$. As seen in FIG. 3, the sizes of the tolerance windows in the discrepancy matrix 300 are not all of the same size. In one embodiment, block 240 and block 250 are performed by mapping logic 150 of invoice resolution logic 110 of FIG. 1.

Figure 4:
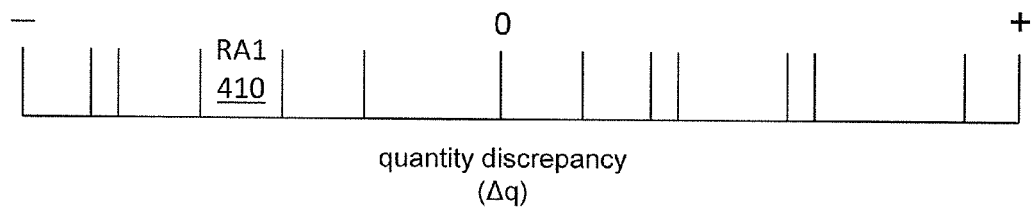
FIG. 4 illustrates a graphical representation of another embodiment of a data structure that maps tolerance windows, covering ranges of cost discrepancies and quantity discrepancies, to resolution actions.
Figure 4:
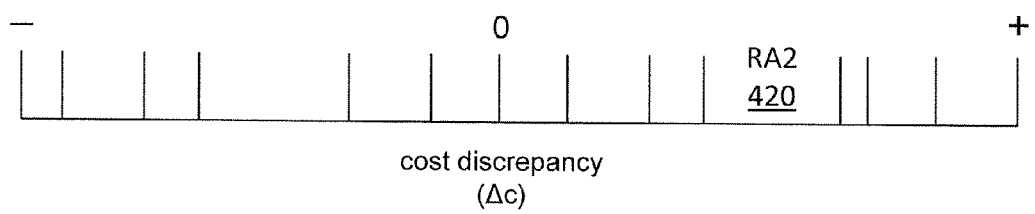

FIG. 4 illustrates a graphical representation of another embodiment of a data structure that maps tolerance windows, covering ranges of cost discrepancies and quantity discrepancies, to resolution actions. In FIG. 4, a separate single-axis data structure is shown for each of the quality discrepancy ($\Delta q$) and the cost discrepancy ($\Delta c$). Each single-axis data structure plots magnitudes of discrepancies that can be both positive and negative. For example, a positive magnitude may correspond to the discrepancy being in favor of the retailer. A negative magnitude may correspond to the discrepancy being in favor of the vendor. Each single-axis data structure in FIG. 4 has windows or ranges of different sizes, corresponding to different bins of discrepancy.

As shown in FIG. 4, a quantity discrepancy falls into range bin (window) 410 of the quantity discrepancy axis and is mapped to a first resolution action RA1. A cost discrepancy falls into range bin (window) 420 of the cost discrepancy axis and is mapped to a second resolution action RA2. In this manner, each type of discrepancy (quantity, cost) can have its own resolution action. This provides a more flexible approach than the matrix embodiment of FIG. 3. As an example, an invoice may be for more units than were actually delivered. However, the unit cost for each unit may be lower than expected. The retailer may accept the lower unit cost, pay it, and adjust the inventory value to match the unit cost. However, the retailer may also create a chargeback for the extra units that were invoiced but not received.

In accordance with one embodiment, separate mapping data structures (matrix or single-axis) can be configured for any particular business relationship between a retailer and a vendor. For example, a retailer may configure a different mapping data structure for each vendor with which the retailer does business. As another example, a retailer can configure a different mapping data structure depending on whether the discrepancy is in favor of the retailer or the vendor. As a further example, a retailer can configure a different mapping data structure for each site or group of a particular vendor. In general, a retailer can configure mapping data structures for any particular business relationship or combination of business relationships. In this way, method 200 may include selecting the appropriate mapping data structure based on the particular business relationship before reaching block 240. In one embodiment, the graphical user interface provided by input/output interface logic 120 of invoice resolution logic 110 of FIG. 1 facilitates the configuring of mapping data structures (and associated tolerance and resolution data structures) by a user.

At block 260, an electronic message is generated that identifies the corresponding resolution action(s) that map to the identified tolerance data range(s). At block 270, the electronic message is transmitted to a computing system (e.g., via network communications) to cause the computing system to perform the corresponding resolution action(s) to resolve the quantity discrepancy amount $\Delta q$ and the cost discrepancy amount $\Delta c$. In one embodiment, the computing system is a financial computing system.

For example, a resolution action RA may involve automatically creating a debit memo (chargeback) to reduce a payment to the vendor when the invoice record exceeds the expected amount reflected in the receipt record (an over-billing scenario). As another example, a resolution action RA may involve automatically adjusting an inventory level to match the amount invoiced by the vendor, whether the invoiced amount was greater than or less than the expected value. Still another resolution action may simply involve paying a billed amount of the invoice record to the associated vendor. Other automatic resolution actions are possible as well and can be mapped to different tolerance windows of a mapping data structure (matrix or single-axis).

Figure 5:
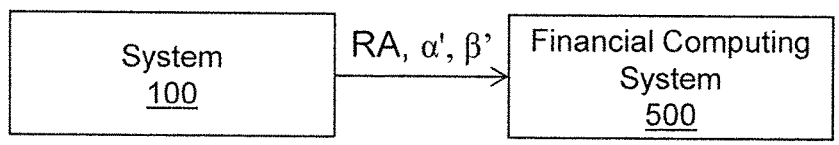
FIG. 5 illustrates an embodiment of the system of FIG. 1 interfacing to a financial computing system to trigger the financial computing system to perform a resolution action.

FIG. 5 illustrates an embodiment of the system 100 of FIG. 1 interfacing to a financial computing system 500 to trigger the financial computing system 500 to perform a resolution action(s). The system 100 sends data (in an electronic message) corresponding to the resolution action(s) RA and the matched invoice and receipt records $\alpha'$ and $\beta'$ to the financial computing system 500. The receiving of the resolution action(s) RA and the matched invoice and receipt records $\alpha'$ and $\beta'$, at the financial computing system 500, triggers the financial computing system 500 to perform the resolution action(s) RA with respect to the matched invoice and receipt records $\alpha'$ and $\beta'$. In one embodiment, it is input/output interface logic 120 of invoice resolution logic 110 of FIG. 1 that sends the electronic message, having data corresponding to the resolution action(s) RA and the matched invoice and receipt records $\alpha'$ and $\beta'$, to the financial computing system 500. The system 100 may receive a second electronic message, via network communications, from the financial computing system 500, in accordance with one embodiment. The second electronic message may indicate whether or not the quantity discrepancy amount and the cost discrepancy amount have been resolved.

In one embodiment, the financial computing system 500 shown in FIG. 5 is separate from and external to (and possibly remote from) the system 100. For example, the system 100 may communicate with the financial computing system 500 via a computerized network (e.g., the internet), in accordance with one embodiment. In another embodiment, the system 100 may be an integral part of the system 500. For example, at least invoice resolution logic 110 may be implemented as part of the financial computing system 500. The financial computing system 500 may be, for example, a computerized accounting system, a computerized billing system, or a computerized invoice management system. Other types of financial computing systems are possible as well, in accordance with other embodiments.

In this manner, method 200 provides for the triggering of the automatic resolution of discrepancies between matched invoices and receipts (i.e., without user interaction). However, a user can define tolerance windows and associated resolution actions for a plurality of retailer/vendor relationships, in advance, such that subsequent execution of method 200 results in the discrepancies being handled in an automated manner. In this way, many different scenarios can be handled uniquely to maximize benefit to the retailer.

Figure 6:
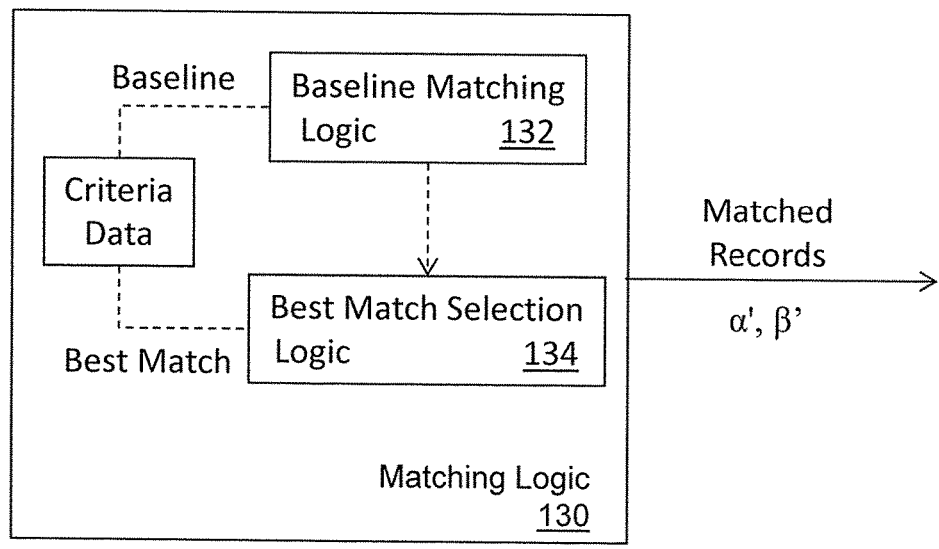
FIG. 6 illustrates one embodiment of a matching logic of the system of FIG. 1 configured to match an invoice record to a receipt record.

FIG. 6 illustrates one embodiment of matching logic 130 of the system 100 of FIG. 1 configured to match an invoice record to a receipt record. Matching logic 130 controls a processor (not shown, see FIG. 7) to perform various functions described herein. Matching logic 130 inputs invoice records α and receipt records β and matches an invoice record α' to a receipt record β' based on predetermined criteria. Invoice records and receipt records are electronic data structures that store data describing an invoice or receipt transaction. Matching logic 130 outputs an invoice record α' that is marked as being matched to a receipt record β'.

In one embodiment, invoice records are retrieved (e.g., via input/output logic 120) from an invoice database (e.g., database device 170), for example, by querying the invoice database. The invoice database may have been populated with invoices received from a supplier or suppliers by way of electronic data interchange (EDI) in a predetermined format configured to correspond to the invoice records stored in the invoice database.

In one embodiment, receipt records are retrieved (e.g., via input/output logic 120) from a receipt database (e.g., database device 170), for example, by querying the receipt database. The receipt database is populated with the receipt records by the warehouses or stores. In one embodiment, the receipt database is populated by extracting receipt related data used in matching from tables maintained by an inventory system that tracks goods as they are received, stocked, and sold to create the receipt records that are stored in the receipt database. A record for a purchase order (PO) referenced by a receipt may be referenced to determine contracted per unit costs for items, and the per unit cost is recorded in the receipt record. In other embodiments the invoice database and/or the receipt database are populated by way of users entering values from paper documents as records.

Referring again to FIG. 6, matching logic 130 includes baseline matching logic 132, best match selection logic 134, and criteria data. The criteria data describes baseline criteria (e.g., a first set of criteria) to be used by baseline matching logic 132 to match invoice records and receipt records. The criteria data also describes the best match criteria (e.g., a second set of criteria) to be used by best match selection logic 134 to select a best match receipt record from among multiple receipt records that match an invoice record according to the baseline criteria.

When matching logic 130 is triggered (e.g., as a batch process), baseline matching logic 132 accesses the invoice records and the receipt records. In one embodiment, all invoice records and all receipt records having the same i) vendor, ii) purchase order (PO) number, and iii) billing location are retrieved for matching by matching logic 130. One example embodiment of baseline matching will now be described.

First, summary group matching is performed. In summary group matching, the total cost of all the invoice records is compared to the total cost of all the receipt records. The total cost of a receipt record may be calculated by baseline matching logic 132 as the per-unit cost of each item taken from the PO for the receipt multiplied by the quantity of items received. The baseline criteria may also require that the total quantities of the invoice records and the total quantities of the receipt records also match. If the sum of the total costs (and optionally the sum of the total quantities) of the invoice records identically matches the sum of the total costs of the receipt records, then all of the invoice records and all of the receipt records are marked as matched and baseline matching ends.

If the sum of the total costs (and optionally the sum of the total quantities) of the invoice records does not identically match the sum of the total costs of the receipt records, then baseline matching logic 132 determines if the sum of the total costs (and optionally the sum of the total quantities) matches within a tolerance level specified in the baseline criteria. If the sum of the total costs (and optionally the sum of the total quantities) of the invoice records matches the sum of the total costs of the receipt records within the tolerance level, then all of the invoice records and all of the receipt records are marked as matched and baseline matching ends.

If the sum of the total costs (and optionally the sum of the total quantities) of the invoice records does not match the sum of the total costs of the receipt records within the tolerance level, the invoice records and receipt records are processed further by baseline matching logic 132 using one-to-one invoice matching. One-to-one invoice matching attempts to match each invoice record with a single receipt record as described next. First baseline matching logic 132 attempts a match between the total cost (and optionally total quantity) of one invoice record and one receipt record. If there is an exact match or a match within the tolerance level, the invoice record and receipt record are marked as matched.

If more than one receipt record is found to match the same invoice record, the invoice record is marked as unresolved and the matching receipt records are provided to best match selection logic 134, which attempts to select a best matching receipt record as will be described below. In one embodiment, if more than one invoice record is found to match the same receipt record, the receipt record and the matching invoice records are provided to best match logic 134. If, after one-to-one matching on all invoice records, no invoice records remain unmatched, baseline matching ends.

During one-to-one matching (i.e., matching a single invoice to a single receipt), if multiple receipt records match the same invoice record the multiple receipt records and the invoice record are provided to best match selection logic 134 so that the best matching receipt record can be selected and matched to the invoice record. This feature is an improvement over other matching systems that would generate a discrepancy for the invoice record that has multiple potential matching receipt records without considering any additional criteria to "break the tie."

In one embodiment, baseline matching logic 132 provides the invoice record and multiple matching receipt records to best match selection logic 134 by storing the records in a predetermined memory location. Baseline matching logic 132 may mark the records as requiring best match selection in a status field of the records and best match selection logic 134 may query a database table for records having data corresponding to the mark in the status field. If a best match receipt record is selected, best match selection logic 134 marks the matching receipt record and invoice record as matched. If a best match record cannot be selected, best match selection logic 134 considers one or more additional "best match criteria" to attempt to select one of the matching invoices.

If at least two receipt records match the invoice record using the baseline criteria, one of the at least two receipt records is selected as a best match receipt record for the invoice when at least one of a second set of matching criteria (i.e., best match criteria) are met as between the invoice record and a single one of the at least two receipt records. This step may be performed by best match selection logic 134. A processor is controlled by best match selection logic 134 to calculate cost and quantity variances and identify line item cost variances. The best match criteria are different than the baseline criteria.

When a best match receipt is selected, the invoice record is marked by recording data in the invoice record that indicates that the invoice record is matched to the receipt record. The marking may be performed by recording data in a status field of the invoice record that indicates that the invoice record has been matched to a receipt.

In one embodiment, a single one of the at least two receipt records having a receipt cost that is closest to the invoice cost is selected as the best match receipt record for the invoice record. This step may be performed by best match selection logic 134 by controlling a processor to compute variance in the total cost of the invoice record and the receipt records.

In one embodiment, a single one of the at least two receipt records having a receipt cost that is more than the invoice cost is selected as the best match receipt record for the invoice record. This step may be performed by best match selection logic 134 by controlling a processor to compute variance in the total cost of the invoice record and the receipt records.

In one embodiment, a single one of the at least two receipt records having a fewest number of item level variances with respect to the invoice record is selected as the best match receipt record for the invoice record. This step may be performed by best match selection logic 134 by controlling a processor to identify line item variances in the invoice record and the receipt records.

In one embodiment, a single one of the at least two receipt records having a receipt quantity that is closest to the invoice quantity is selected as the best match receipt record for the invoice record. This step may be performed by best match selection logic 134 by controlling a processor to compute variance in the total quantity of the invoice record and the receipt records.

It can be seen from the foregoing description that the systems and methods herein automatically consider additional criteria to select a best match receipt record from amongst multiple matching receipt records that meet baseline matching criteria. This saves time and expense by automatically performing the selection without requiring manual resolution by a human operator.

Computing Device Embodiment

Figure 7:
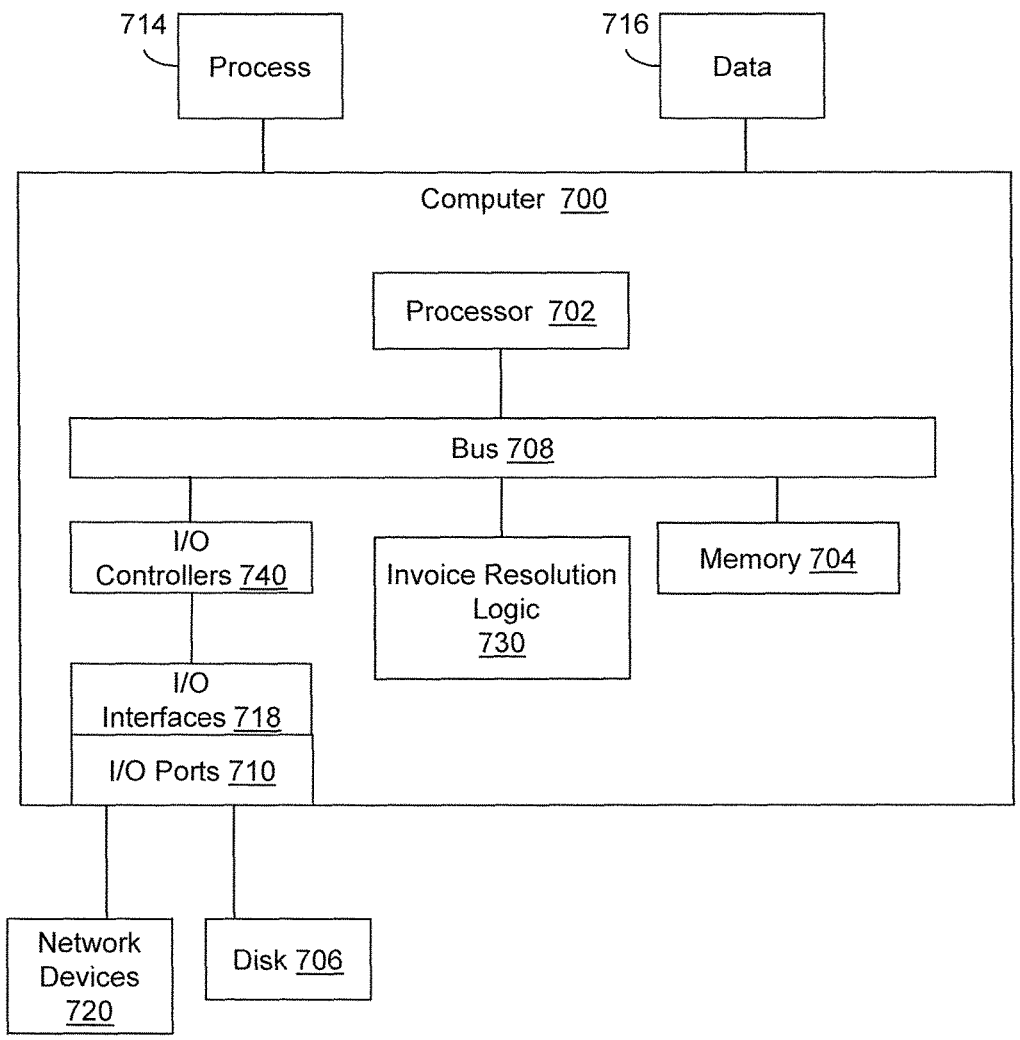
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 may include invoice resolution logic 730 configured to perform invoice record and receipt record matching with automatic discrepancy resolution in a manner similar to the invoice resolution logic 110 shown in FIG. 1. In different examples, the invoice resolution logic 730 may be implemented in hardware, a non-transitory computer-readable medium with stored instructions, firmware, and/or combinations thereof. While the invoice resolution logic 730 is illustrated as a hardware component attached to the bus 708, it is to be appreciated that in other embodiments, the invoice resolution logic 730 could be implemented in the processor 702, stored in memory 704, or stored in disk 706.

In one embodiment, invoice resolution logic 730 or the computer is a means (e.g., structure: hardware, non-transitory computer-readable medium, firmware) for performing the actions described herein. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform the method 200 of FIG. 2. The means may also be implemented as stored computer executable instructions that are presented to computer 700 as data 716 that are temporarily stored in memory 704 and then executed by a processor 702.

Invoice resolution logic 730 may also provide means (e.g., hardware, non-transitory computer-readable medium that stores executable instructions, firmware) for performing the method 200 of FIG. 2.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a compact disk-read only memory (CD-ROM) drive, a CD recordable (CD-R) drive, a CD read/write (CD-RW) drive, a digital video disc (DVD) ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and universal serial bus (USB) ports.

The computer 700 can operate in a network environment and thus may be connected to the network devices 720 via the I/O interfaces 718, and/or the i/o ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

For simplicity sake, throughout the description reference is made to criteria, values, and records. It is to be understood that these terms refer to data or data structures that encode the criteria, values, and records in a manner that is interpretable by a computing device. Likewise, the terms supplier, warehouse, inventory system, financial system, retailer refer to computer systems and components that perform the described functions on the data structures encoding the criteria, values, and records.

Systems, methods, and other embodiments have been described that are configured to automatically resolve discrepancies between matched invoice and receipt records. In one embodiment, input/output logic is configured to receive multiple invoice records and multiple receipt records. Each invoice record stores data describing an invoice quantity of items and an invoice cost. Each receipt record includes data describing a receipt quantity of items and a receipt cost. Matching logic is configured to match an invoice record of the multiple invoice records to a receipt record of the multiple receipt records. Discrepancy logic is configured to determine a quantity discrepancy amount and a cost discrepancy amount between the invoice record and the receipt record as matched by the matching logic. Mapping logic is configured to identify a tolerance window, from a set of tolerance windows, into which the quantity discrepancy amount and the cost discrepancy amount fall. Mapping logic is also configured to identify a resolution action, of a set of resolution actions, which is mapped to the identified tolerance window. Input/output logic is also configured to trigger a computing system to perform the resolution action to resolve the quantity discrepancy amount and the cost discrepancy amount.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least one processor for executing instructions from a memory, the method comprising:

matching an invoice record to a receipt record via at least one processor, wherein the invoice record stores data describing an invoice quantity of items and an invoice cost, and wherein the receipt record stores data describing a receipt quantity of items and a receipt cost;

determining a quantity discrepancy amount, via the at least one processor, between the invoice record and the receipt record;

determining a cost discrepancy amount, via the at least one processor, between the invoice record and the receipt record;

creating a mapping entry within a mapping data structure of tolerance data ranges to resolution actions, wherein the mapping entry maps a tolerance data range for a cost and quantity discrepancy pair to a set of resolution actions;

in response to the quantity discrepancy amount and the cost discrepancy amount corresponding to the tolerance data range within the mapping data structure, (i) selecting a resolution action from the set of resolution actions and (ii) generating an electronic message that identifies the resolution action; and transmitting, via network communications, the electronic message to a computing system to invoke the computing system to automatically perform the resolution action without user intervention to resolve the quantity discrepancy amount and the cost discrepancy amount.

2. The method of claim 1, wherein the resolution action includes adjusting an inventory value.

3. The method of claim 1, wherein matching the invoice record to the receipt record includes performing at least one computerized comparison operation between the invoice record and a plurality of receipt records to find the receipt record of the plurality of receipt records being a best match to the invoice record based on at least one set of matching criteria.

4. The method of claim 1, further comprising receiving a user selection of the resolution action from the set of resolution actions.

5. The method of claim 1, further comprising utilizing mapping logic to select the resolution action from the set of resolution actions.

6. The method of claim 1, further comprising receiving from the computing system, via the network communications, a second electronic message indicating that the quantity discrepancy amount and the cost discrepancy amount have been resolved.

7. The method of claim 1, wherein the quantity discrepancy amount and the cost discrepancy amount are percentage values.

8. The method of claim 1, wherein the quantity discrepancy amount is a number of items, and wherein the cost discrepancy amount is a monetary amount.

9. The method of claim 1, wherein the computing system includes at least one of a computerized accounting system, a computerized billing system, and a computerized invoice management system.

10. A computing system, comprising:
an input/output module, including instructions stored in a non-transitory computer-readable medium, configured to:
retrieve a plurality of invoice records, where each invoice record includes data describing an invoice quantity of items and an invoice cost, and
retrieve a plurality of receipt records, where each receipt record includes data describing a receipt quantity of items and a receipt cost;
a matching module, including instructions stored in a non-transitory computer-readable medium, configured to match an invoice record of the plurality of invoice records to a receipt record of the plurality of receipt records;
a discrepancy module, including instructions stored in a non-transitory computer-readable medium, configured to determine a quantity discrepancy amount and a cost discrepancy amount between the invoice record and the receipt record as matched by the matching module; and
a mapping module, including instructions stored in a non-transitory computer-readable medium, configured to:
create a mapping entry within a mapping data structure of tolerance windows to resolution actions, wherein the mapping entry maps a tolerance window for a cost and quantity discrepancy pair to a set of resolution actions;
in response to the quantity discrepancy amount and the cost discrepancy amount corresponding to the tolerance window within the mapping data structure, select a resolution action from the set of resolution actions,
wherein the input/output module is further configured to:
generate an electronic message that identifies the resolution action, wherein the resolution action includes adjusting an inventory value, and
transmit, via network communications, the electronic message to a computing system to invoke the computing system to automatically perform the resolution action without user intervention to resolve the quantity discrepancy amount and the cost discrepancy amount.

11. The computing system of claim 10, further comprising a database device configured to store at least the plurality of invoice records and the plurality of receipt records.

12. The computing system of claim 10, wherein the matching module includes a baseline matching module configured to match the invoice record to at least one receipt record of the plurality of receipt records such that the invoice record is deemed to match the at least one receipt record when a first set of criteria are met.

13. The computing system of claim 12, wherein the matching module includes a best matching module configured to, when the at least one receipt record matched by the baseline matching module includes at least two receipt records, select a single one of the at least two receipt records when a second set of criteria are met.

14. The computing system of claim 10, wherein the input/output module comprises a visual user interface module configured to provide a graphical user interface and facilitate configuring of the tolerance windows, the resolution actions, and the mapping of tolerance windows to resolution actions via the graphical user interface.

15. The computing system of claim 14, further comprising a display screen configured to display and facilitate user interaction with at least the graphical user interface.

16. A non-transitory computer-readable medium storing computer-executable instructions that, when executed by a computer, cause the computer to perform functions, wherein the instructions comprise:
instructions for matching an invoice record to a receipt record, wherein the invoice record stores data describing an invoice quantity of items and an invoice cost, and wherein the receipt record stores data describing a receipt quantity of items and a receipt cost;
instructions for determining a quantity discrepancy amount between the invoice record and the receipt record;
instructions for determining a cost discrepancy amount between the invoice record and the receipt record;
instructions for creating a mapping entry within a mapping data structure of tolerance windows to resolution actions, wherein the mapping entry maps a tolerance window for a cost and quantity discrepancy pair to a set of resolution actions;
instructions for selecting a resolution action from the set of resolution actions in response to the quantity discrepancy amount and the cost discrepancy amount corresponding to the tolerance window within the mapping data structure
instructions for generating an electronic message that identifies the resolution action, wherein the resolution action includes adjusting an inventory value; and
instructions for transmitting the electronic message to a computing system to invoke the computing system to automatically perform the resolution action without user intervention to resolve the quantity discrepancy amount and the cost discrepancy amount.

17. The non-transitory computer-readable medium of claim 16, wherein the instructions for transmitting the electronic message to a remote computing system to cause the remote computing system to perform the resolution action include instructions for causing charging back an overbilling amount to an associated vendor.

18. The non-transitory computer-readable medium of claim 16, wherein the instructions further include instructions for configuring the set of tolerance windows in at least one tolerance data structure stored in a computerized memory.

19. The non-transitory computer-readable medium of claim 16, wherein the instructions further include instructions for configuring the mapping of tolerance windows to resolution actions in the mapping data structure stored in a computerized memory.

20. The non-transitory computer-readable medium of claim 16, wherein the instructions for matching the invoice record to the receipt record further include instructions for performing at least one computerized comparison operation between the invoice record and a plurality of receipt records to find the receipt record of the plurality of receipt records being a best match to the invoice record based on at least one set of matching criteria.

\* \* \* \* \*